Dec. 13, 1960 H. W. TREVASKIS 2,964,333
FLUID PRESSURE SYSTEM AND LEVELING
VALVE FOR VEHICLE SUSPENSION
Filed Oct. 22, 1957 4 Sheets-Sheet 1

INVENTOR
Henry William Trevaskis
by Benj. T. Rauber
his attorney

United States Patent Office 2,964,333
Patented Dec. 13, 1960

2,964,333

FLUID PRESSURE SYSTEM AND LEVELING VALVE FOR VEHICLE SUSPENSION

Henry William Trevaskis, Point Pleasant, Blackdown, near Leamington Spa, England, assignor to Dunlop Rubber Company Limited, London County, England, a British company Filed Oct. 22, 1957, Ser. No. 691,565

Claims priority, application Great Britain Oct. 26, 1956

8 Claims. (Cl. 280—124)

The present invention relates to hydraulic valves for the fluid suspension systems of vehicles wherein the vehicle chassis is supported on columns of fluid comprising wholly, or in part, a hydraulic liquid column the height of which may be varied automatically in accordance with the loading of the vehicle so that the chassis is maintained at a predetermined static height above the ground or other supporting surface.

The object of the present invention is to provide a hydraulic valve which is automatically operative to control the flow of pressure liquid to or from the hydraulic portions of said fluid columns in accordance with whether the actual height of the vehicle chassis from the ground is above or below the predetermined normal static height.

According to the present invention a levelling valve for a vehicle fluid pressure suspension system comprises a valve housing, a pressure chamber therein adapted to be placed in liquid pressure communication with a connection to a hydraulic portion of a fluid spring, a pressure-operated valve adapted to be urged by liquid pressure in said chamber to open a passage for the free circulation of pressure liquid from a source through said housing and back to said source and means responsive to variations in the distance between a sprung and an unsprung portion of said vehicle in one sense to reduce the liquid pressure in said pressure chamber to close said pressure-operated valve and divert the flow of pressure liquid in said passage to the connection to said fluid spring, and in the opposite sense to maintain the liquid pressure in said pressure chamber and to divert pressure liquid in said fluid spring connection to said source.

Figure 1:
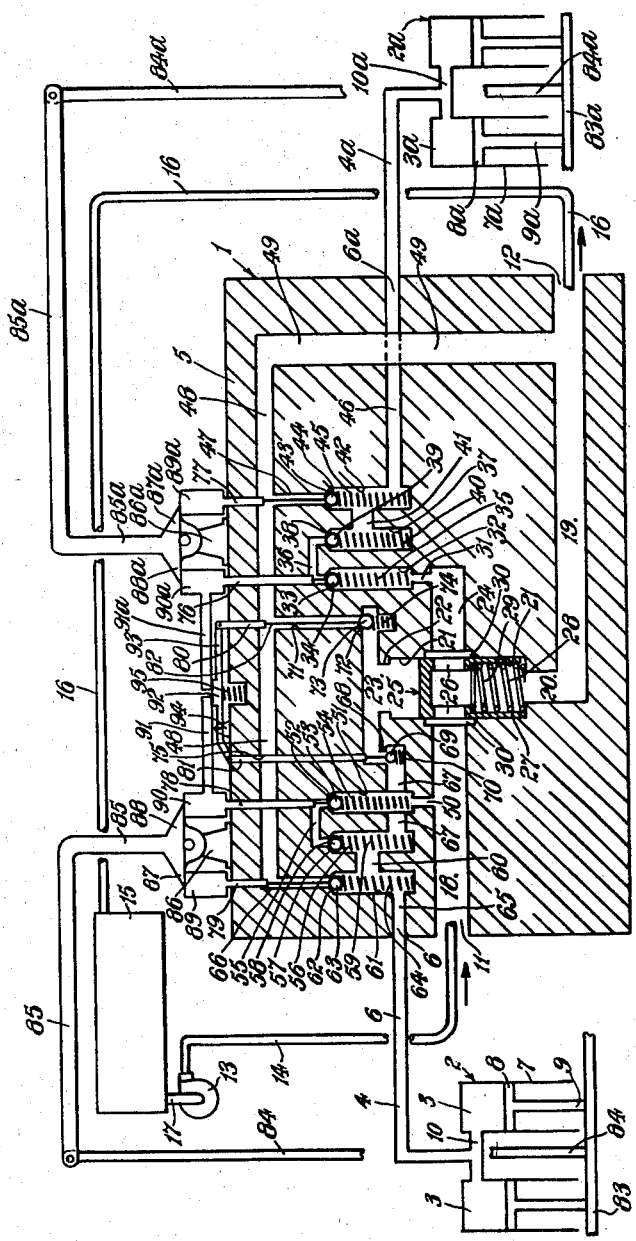
Figure 2:
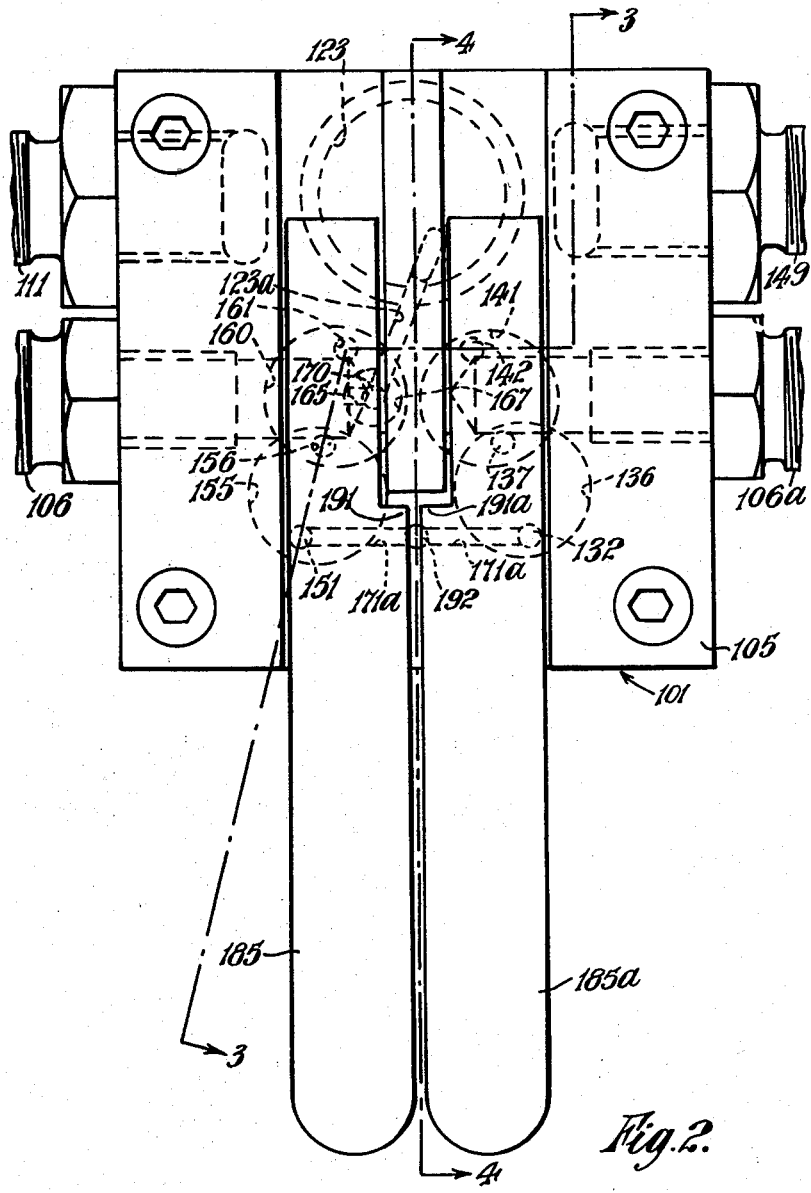
Figure 3:
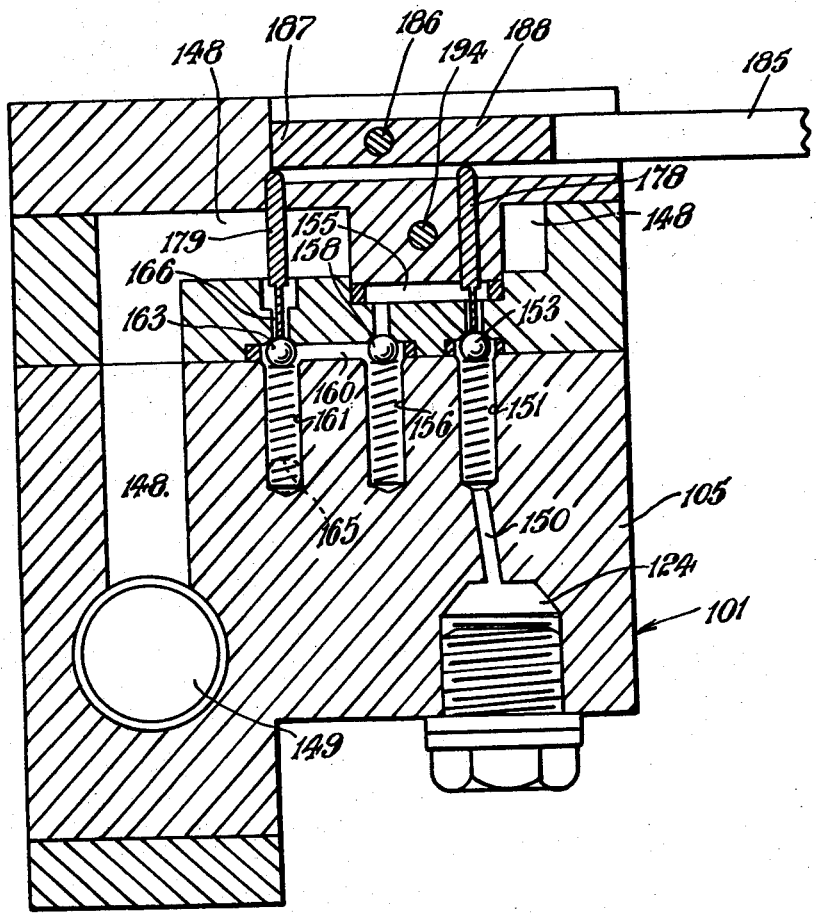
Figure 4:
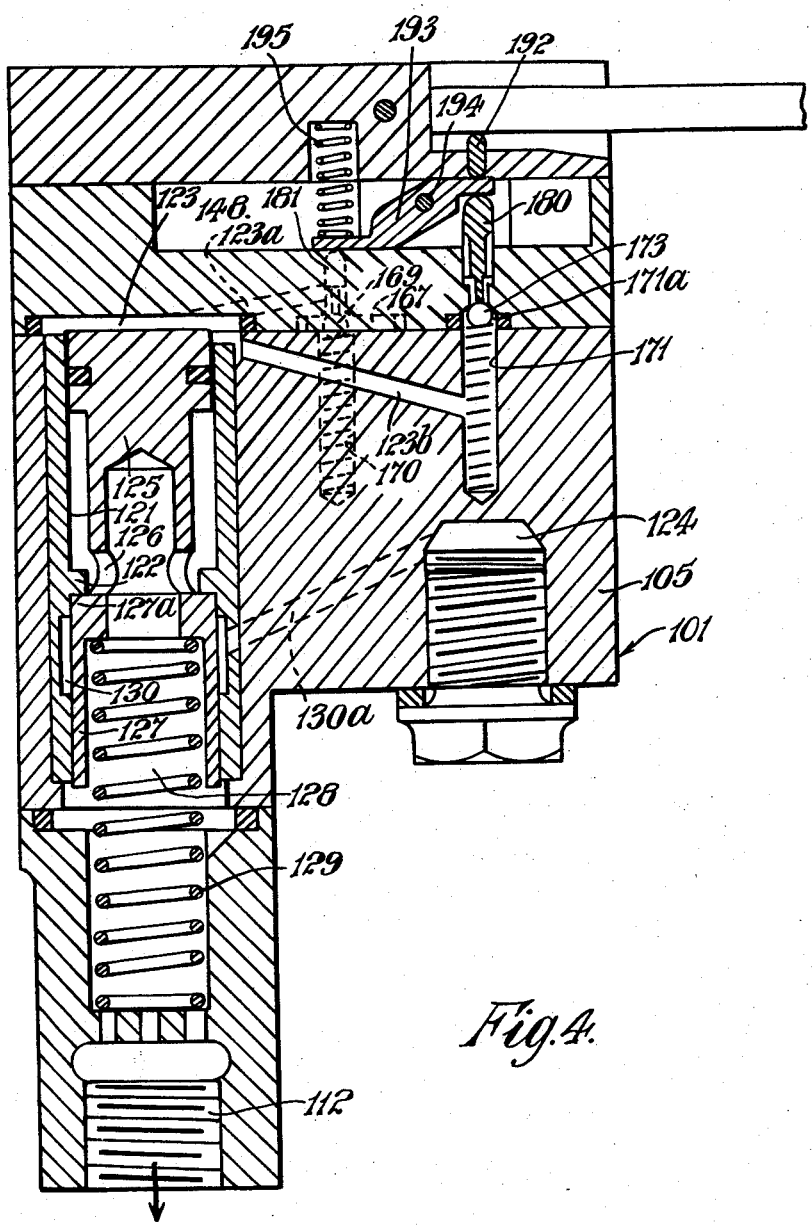

But a better understanding of the invention may be had from the following description when this is read with reference to the accompanying drawings, of which:

Figure 1 is a diagrammatic section through a levelling valve according to the invention, Figure 2 is a top plan view of a practical embodiment of the valve shown diagrammatically in Figure 1, and Figures 3 and 4 are, respectively, sections taken on the lines 3—3 and 4—4 of Figure 2.

As shown in Figure 1, the valve 1 of the present invention is associated with the fluid suspension springs 2 of a vehicle and is in hydraulic communication with the liquid-displacement chambers 3 thereof through conduits 4 which are connected to the body 5 of the valve 1 through supply ports 6 formed therein.

The fluid springs 2 are shown in their simplest form as each comprising a cylinder 7 having a piston 8 fluid-tightly slidable therein. The rod 9 of the piston 8 is pivotably secured to an unsprung portion of the vehicle, such as to an axle housing or axle adjacent one of the vehicle's wheels, and the cylinder 7 is secured to a sprung portion of the vehicle, such as to a chassis or body member thereof. This is all in the known manner and as this arrangement forms no portion of the invention a more-detailed description is deemed to be unnecessary. One such piston and cylinder device is associated with each wheel of the vehicle and acts as a supporting means therefor in lieu of the more-conventional metallic springs. For this reason, the piston and cylinder devices are referred to herein as "fluid springs."

The term "fluid" is deliberately applied in its widest sense as although, for the sake of simplicity and clarity, in the ensuring description the devices 2 and 2a diagrammatically shown in the drawings are essentially hydraulic devices.

The displacement chambers 3 of the fluid springs 2 shown in Figure 1, therefore, are filled with hydraulic liquid which is delivered thereto under pressure from the delivery ports 6 by the conduit 4, and the chambers 3 of the fluid springs 2 associated with the respective front and rear axles are interconnected by a conduit 10.

The function of the present valve is to maintain the separate fluid springs in a predetermined condition so that the supported portion of the vehicle at each point where the fluid springs are provided (normally at each of the four "corners" of the vehicle defined by the wheels) maintains a predetermined spaced relationship with the surface upon which the vehicle is supported. Thus, the valve is operative, not only to maintain the chassis at a constant mean height from the supporting surface, but also to maintain the chassis substantially level with that surface in a fore-and-aft direction despite uneven loading of the fluid springs. The valve thus acts as a levelling valve and is referred to as such herein.

The housing also comprises an inlet port 11 and an outlet port 12 whereby liquid pressure produced by a constantly-operating pump 13 is fed through a conduit 14 to the inlet port 11, through normally-open passages, later to be described, in the housing 5, and thence through the outlet port 12 and a conduit 16 into a liquid reservoir 15 from which the pump 13 receives its supply of liquid through a conduit 17.

The pump 13 is adapted to be operated constantly whenever the vehicle is in use, whether moving or stationary, and at all times except when the levelling valve is operating to raise the vehicle, as will be described hereunder, there is a constant uninterrupted flow of liquid pressure through the housing between the inlet and outlet portions 11 and 12.

Formed in one end wall of the housing 5 and extending longitudinally inwardly thereof for a substantial distance parallel to the longitudinal surfaces of the housing is a passage 18 which, at its outer end, joins the inlet port 11.

The passageway 18 forms an inlet passageway. Intersecting the passageway 18 is an exhaust passageway comprising a short passageway 20 intersecting the passageway 18 and a passage extending therefrom to the exhaust outlet 12. The passageway 20 is enlarged in diameter at its intersection with the passageway 18 to form a cylindrical chamber 21. The upper end of the chamber 21 is slightly restricted by an annular flange 22 through the inner periphery of which a passage extends into a pressure chamber 23, having its greatest dimension lying parallel with the passage 18 and extending for a distance on each side of, and above, the chamber 21.

The chamber 21 crosses the passageway 18 intermediate its ends, leaving a pocket 24 of the passageway 18 on the side of the chamber 21 remote from the inlet port 11. A cylindrical cup-like, pressure control, slide valve 25, having a diametrical passage 26 formed therethrough adjacent its upper end, is located in the chamber 21 in such a manner that when a cylindrical skirted portion 27 thereof is in the lower portion of the chamber 21, the diametrical passage 26 coincides with the passage 18 and pocket 24 to permit pressure liquid from the passage 18 to flow diametrically through the slide valve 25 into said pocket. The upper end of the slide valve 25, lying towards the pressure chamber 23, is a blank end, and an axial passage 28 for pressure liquid is provided in the lower skirted portion 27 so that when the slide valve 25 is in its lowest position in the chamber 21, as later will be described, a free passage for pressure liquid is provided between the passage 18 and the passages 20 and 19 through one end of the diametrical passage 26 and the axial passage 28. A helical compression spring 29 is located between the base of the chamber 21 and the interior of the skirt 27 of the slide valve 25 and tends to urge the slide valve 25 inwards in the chamber 21 until its head abuts the flange 22 and the skirt 27 closes the axial passage 28 to the flow of pressure liquid between the passages 18 and 19. Where it crosses the passage 18 the chamber 21 is increased in diameter so that when the skirt 27 is in position across the passage 18 an annular chamber 30 is provided therearound to permit the flow of pressure liquid from the passage 18 into the pocket 24.

It will thus be apparent that when the slide valve 25 is in its lower position in the chamber 21 (which, as later will be seen, is its normal operative position), there is a free passage for the constant flow of pressure liquid from the pump 13 through the conduit 14, inlet port 11, passages 18, 28, 20 and 19, outlet port 12, conduit 16, reservoir 15 and conduit 17 back to the pump 13. Liquid pressure is thus always available for instantaneous actuation of the levelling valve without the need for a heavy, and perhaps bulky, pressure accumulator, with all its attendant disadvantages.

From the uppermost portion of the bore of the pocket 24, adjacent the blank end thereof, a passage 31 is directed vertically-upwardly at right-angles to the pocket 24 for a short distance, after which it is increased in diameter to form a vertical valve chamber 32, the upper end of which is conical in shape to form a seat 33 for a ball valve 34 which is normally held in engagement with the seat 33 by a helical compression spring 35, the opposite end of which engages the base of the chamber 32. The passage 31 is continued upwards through the upper face of the valve body 5. A horizontal passage 36 is branched off the passage 31 immediately above the seat 33 and this passage joins the upper end of a further valve chamber 37, parallel to the chamber 32, and of similar construction except that its lower end is blank. The upper end of the chamber 37 forms a seat 38, identical with the seat 33, for a ball valve 39 which is normally held seated by a helical compression spring 40.

Substantially midway up the valve chamber 37 a horizontal passage 41 connects the valve chamber 37 with a similar valve chamber 42 having a seat 43 at its upper end for a ball 44 spring-urged against the seat 43 by a helical compression spring 45. Adjacent the base of the chamber 42 a horizontal passage 46 leads to the supply port 6a for one pair of fluid springs 2a which, for the sake of convenience, will be regarded as the front fluid springs.

From the upper end of the chamber 42 a passage 47 leads vertically through a passage 48 formed horizontally along the interior of the housing 5 adjacent its upper wall and connected at one end to a vertical passage 49 which joins the passage 19 adjacent the outlet port 12.

From the passage 18 a passage 50 is formed vertically upwards from the upper wall of the passage, similarly to the passage 31 from the pocket 24 and disposed, symmetrically with the passage 31, on the opposite side of the chamber 21. As in the case of passage 31, the passage 50 is increased in diameter to form a valve chamber 51 identical with the chamber 32, and in the chamber 51 are similarly provided a valve seat 52, a ball valve 53 and a spring 54. The passage 50 continues upwards through the upper wall of the housing 5.

The upper end of the chamber 51, above the valve seat 53, is connected by a horizontal passage 55 with the upper end of a valve chamber 56, the junction of the passage 55 with the chamber 56 comprising a valve seat 57 adapted to be closed by a non-return ball valve 58 normally held on its seat by a compression spring 59. The valve chamber 56 is thus substantially the same as the chamber 37 except as will be described hereunder.

A horizontal passage 60 formed in the wall of the chamber 56 substantially midway of its height connects the chamber 56 to a parallel chamber 61, which is identical with the chamber 42, and comprises a valve seat 62 at its upper end, and a ball valve 63 held thereon by a compression spring 64. A horizontal passage 65 connects the lower end of the chamber 61 with the supply port 6 to the rear fluid springs 2. A vertical passage 66 connects the upper end of the chamber 61 with the end of the passage 48, the other end of which is connected to the passage 49 and outlet port 12.

From the lower end of the valve chamber 56 a passage 67 extends parallel with the passage 18 to a point overlapping, but spaced apart from, the adjacent end of the pressure chamber 23, and the passage 67 and pressure chamber 23 are connected by a short vertical passage comprising an annular valve seat 68 against which a normally-open ball valve 69, located in the passage 67, is urged towards seating engagement by a compression spring 70. Towards the other end of the pressure chamber 23 a vertical passage 71 is extended upwards parallel with the passages 47 and 66, into the passage 48. The junction of the pressure chamber 23 and passage 71 comprises a valve seat 72 against which is normally seated a ball valve 73, located in the pressure chamber 23 and held against the seat 72 by a compression spring 74.

The passages 31, 47, 50, 66, and 71, are all extended vertically through the upper wall of the housing 5, and a further passage 75 is extended vertically through this wall from the end of the pressure chamber 23, coaxially above the valve seat 68. In each of these passages is fluid-tightly slidable a plunger 76, 77, 78, 79, 80, and 81, respectively. Where each of these plungers 76 to 81 passes through a portion of a passage adapted to carry pressure liquid it is reduced in diameter so as to provide the least possible obstruction to the flow as, for example, the reduced portion 82 of the plunger 80 within the passages 71 and 48 and similar reduction of the plungers 77 or 79 within the respective passages 48 and 47 or 66.

Each plunger has a reduced portion at the point of its contact with the respective ball 34, 44, 53, 63, 73, and 69 and this contact is of such a value that, with the sole exception of the ball 69, the balls remain seated upon their respective seats when the fluid springs are in their static position. The plunger 81 normally holds the ball 69 away from its seat, for a reason which will become apparant hereunder.

The plungers 76 to 81 are operatively associated with means which are responsive to variations of the actual height of the vehicle chassis above or below a predetermined static height to open or close the appropriate ball valves for the control of the flow of liquid pressure to, or from, the respective fluid springs 2, 2a as necessary for maintenance of the static height.

Accordingly, as shown diagrammatically to the left of Figure 1, the piston rods 9 of the fluid springs 2 are connected to each end of an axle 83 adjacent each wheel. A vertical distance rod 84, of a predetermined length such that when connected as hereunder described the chassis and axle will be at the predetermined static separation when the levelling valve is activated but inoperative, is connected midway of the axle and extends upwardly to be pivotally connected to the end of one arm of an L-shaped rocker arm 85 which is in turn pivoted at the free end of its other arm to a bracket 86 secured to the body 5 of the levelling valve 1 or to an adjacent portion of the chassis or body, to which the levelling valve is also secured.

The end of the arm of the lever 85 adjacent its pivotal connection with the bracket 86 has transversely extending cam surfaces 87, 88 which are adapted to abut the adjacent upper surfaces of thrust blocks 89, 90 attached to the upper ends of the respective plungers 79 and 78. From the block 90 a horizontal arm 91 is extended parallel with the top surface of the housing 5 to a position substantially midway between the passages 71, 75 where its free end engages the upper surface of a boss 92 secured to the upper surface of a horizontal lever 93 which is pivoted, towards the end thereof nearest the passage 75, in a bracket 94 secured to the adjacent face of the housing 5. The plunger 81 is pivoted to the end of the lever adjacent the bracket 94 and the plunger 80 is pivoted to its other end. A helical compression spring 95 between the housing 5 and the underside of the lever 93 adjacent the boss 92 normally urges the boss 92 into contact with the arm 91 so that if the lever 85 pivots to the right, as in Figure 1, the lever 93 will be pivoted to open the ball valve 73 and close the ball valve 69, and subsequent movement of the lever 85 back to its static, medial, position will cause the lever 93 to follow the arm 91 and so ensure immediate closure of valve 73 and re-opening of valve 69.

A similar arrangement of parts 83 to 91 is applied to the front fluid springs 2a and their associated valves, and in order to eliminate unnecessary duplication of description, certain of these parts are indicated in the drawing by the reference numbers as used for similar portions of the rear fluid springs but with the suffix "a" to distinguish between the front and rear suspensions; the suffixed numbers referring to the front of the vehicle.

As has been described, when the vehicle is in a static position with its body at the predetermined height, all the valves in the levelling valve 1 are closed, with the sole exception of the valve 69 which, through the conduits 10 and 4, passage 65, chamber 61, passage 60, chamber 56, and passage 67 permits the liquid pressure prevailing in the chambers 3 of the rear fluid springs 2 to prevail in the pressure chamber 23, where it reacts constantly against the blank end of the cup-like slide valve 25 to press it down in the chamber 21 and bring the diametrical passage 26 into hydraulic communication with the passage 18 and allow pressure liquid to flow from the pump 13 through the passages 18, 28, 20, and 19 back to the reservoir 15. Thus, so long as the liquid pressure in the chamber 23 is higher than the value of the spring 29 the slide valve 25 will permit the free flow of pressure liquid through the housing without any of the liquid pressure therein being passed to the chambers 3, 3a of the fluid springs 2, 2a.

Now if, in the case of a good vehicle, the vehicle is standing with the pump 13 in operation, and the body at its static height, and a packing case or other weight is placed on the platform of the vehicle, an additional load will be applied to the rear fluid springs 2 and the body will move towards the ground as a result. This will cause the rod 84 to pivot the lever 85 in a clockwise direction so that the cam surface 88 will depress the block 90 and the arm 91, which will also cause the plunger 78 to press the valve 53 off its seat 52. Pressure of the arm 91 on the boss 92 also pivots the lever 93 in a clockwise direction, pressing the plunger 80 down to unseat the ball valve 73 and also raising the plunger 81 away from the ball 69 which is forced onto its seat by the spring 70.

Closing the valve 69 shuts off the liquid pressure in the chambers 3 from the pressure chamber 23, and opening of the valve 73 in the chamber 23 releases the liquid pressure previously existing therein to the outlet conduit 16, through the passages 71, 48, 49 and 19, and the outlet port 12. Release of the liquid pressure in the pressure chamber 23 allows the spring 29 to push up the slide valve 25 in the chamber 21 so that the passage 26 is moved away from the passage 18 and the skirt 27 closes the axial passage 28 from the passage 18. Flow of pressure liquid from the pump 13 through the passage 19 and back to the reservoir 15 is thus prevented, and the liquid pressure generated by the pump 13 is passed into the chambers 51 and 32. The pressure in the chamber 32 is ineffective, as the valve 34 therein is still closed, but downward movement of the block 90 has pressed the valve 53 off its seat 52, and liquid pressure in the chamber 51 thus flows past the valve 53 and along the passage 55 where it unseats the valve 58 and flows into the chamber 56 and thence through passage 60, chamber 61, in which the valve 63 remains closed, through passage 65 and supply port 6 to conduits 4 and 10 and the chambers 3 of the fluid springs 2. This causes the pistons 8 to be forced down the cylinders 7 and the body is raised away from the ground.

As the body rises, the rod 84 holds the end of lever 85 against movement, and the lever 85 accordingly pivots in a counterclockwise direction to withdraw the cam 88 from the block 90, which rises under the influence of the springs 54 and 74 (which also press the respective balls against their plungers) and the spring 95, which pivots the arm 93, to its normal position. Upward movement of the plungers 78 and 80 allows the valves 53 and 73 to close, and pivoting of the arm 93 in this direction presses the plunger 81 down to re-open the valve 69. Closure of the valve 53 shuts off the flow of liquid pressure to the chamber 56 and the non-return valve 58 is closed by its spring 59. The flow of liquid pressure to the fluid springs 2 is stopped by closure of the valve 53 and "back pressure" from the chambers 3 of the fluid springs 2 passes through the chamber 61, passage 60, chamber 56, passage 67 and now-open valve 69 into the pressure chamber 23 where it again reacts upon the slide valve 25 to move the passage 26 into line with the passage 18 and again permit the free flow of pressure liquid from the pump 13 through passages 18, 26, 28 and 19 to the reservoir 15.

If, now, say two packing cases are removed from the vehicle, its chassis will rise above the static height, and the lever 85 will be pivoted so that the cam 87 engages the block 89 and presses it downwards to press the plunger 79 in the passage 66 against the ball 63 in the chamber 61 and move the ball 63 off its seat 62. All other valves remain unaffected and liquid pressure from the chamber 3 is passed through the valve seat 62 and passage 66 into the passages 48 and 49 to the outlet port 12 and reservoir 15. The valve 69 is unaffected and the pressure in the chambers 3 thus holds down the valve 25 to permit free flow of pressure liquid through the passages 18, 26, 28 and 29. As the pressure in the chambers 3 decreases, the lever 85 gradually releases the plunger 79 and allows the valve 63 to close.

The levelling valve acts in a similar way if the load changes are on the front axle of the vehicle.

If the front of the body rises away from the front axle the lever 85a moves in a clockwise direction to depress the block 89a and plunger 77 to open the valve 44 and allow liquid pressure in the chambers 3a to flow through the conduits 10a and 4a, port 6a, passage 46, chamber 42, passages 47, 48 and 49 to the outlet port 12 and the reservoir 15. The back pressure from the chambers 3 still holds the valve 25 down to permit the free flow of pressure liquid through the housing 5 from the pump 13, and it is to be understood that the valve 25 is always under the control of the same set of fluid springs regardless of which end of the vehicle is undergoing height adjustment.

Movement of the front of the body downwards from the static position pivots the lever 85a in a counterclockwise direction, causing the cam 88a to depress the block 90a and plunger 76 and open the valve 34. Simultaneously the arm 91a swings the lever 93 about its pivot to cause the plunger 80 to open the valve 73 and the plunger 81 to move away from the valve 69 and permit it to close. The slide valve 25 moves to close the passage 26, 28 through the passage 19, and liquid pressure in the passage 18 passes around the annular space 30 and through the pocket 24 into passage 31, past the valve 34 into passage 36, unseating non-return valve 39 and passing into chamber 37, from whence it flows to the chambers 3a through passage 41, chamber 42, passage 46, port 6a and conduits 4a and 10a.

Recovery of the front wheel valve arrangement, on the vehicle attaining its static height, is similar to the recovery of the rear wheel valve arrangement except that a different set of valves is involved.

The levelling valve is operative to control the front and rear fluid springs, simultaneously to increase the height of both ends of the body, to reduce the height of both ends, or to reduce the height of one end and increase the height of the other end. It is also operative to vary the height of either end separately.

Thus, if it is necessary to increase the height of the front of the vehicle and lower that of the rear as, for instance, could be necessitated by a passenger from a rear seat moving into a front seat, both arms 85, 85a would move in a counterclockwise direction to open the valve 63 to exhaust the excess pressure liquid from the rear fluid springs 2, and to close the valves 69 and 25 and open the valves 73, 34 and 39 to pass liquid pressure to the front fluid springs 2a. Closing of the slide valve 25 would prevent any pressure flow through the passages 26, 28 and 19, but the flow through the passages 48, 49 would not be effected, so that despite the restriction of the flow through passage 19 the reduction of pressure in the rear springs would still take place; neither would this reduction affect the increase of liquid pressure in the front springs, and when the static height at opposite ends of the vehicle was obtained the levelling valve would return to its normal static condition.

One levelling valve 1 can be inserted between each pair of fluid springs 2 or 2a if so desired. This would, however, require one pump 13 for each housing 5, as pressure could not be built-up in the passages 31 or 50 of either housing 5 of a pair of such valves connected in parallel to one pump 13 if the passages 18, 26, 28, 19 of the other were open. Furthermore the left hand portion of the valve 1, as shown, is operative on a single fluid spring, and if the lever 85a and conduit 4a are omitted from a valve 1, and the left hand connections only are made to the front axle and fluid springs in the same way as they are described as being connected to the rear axle and springs an installation of two such levelling valves may be arranged so that one, connected as last described, operates on the two front springs in parallel, and the other inserted in the conduit 10a, operates on each rear spring separately. In the latter case a distance rod 84 would need to be secured to each end of the axle, and two independent pumps 13 again would be required.

The valve arrangement associated with the lever 85a cannot be isolated for independent operation in the manner just described, as the flow-obstructing slide valve 25 is operable only through the passages 65, 67 on the left of the housing.

Figures 2, 3 and 4 show a practical arrangement of the diagrammatic valve mechanism described hereabove with reference to Figure 1. To assist in the identification of the features shown in these figures with those shown in Figure 1 the same reference numerals are used with the prefix 100 in the following description, which relates more specifically to that portion of the mechanism lying on the left of Figure 1.

The valve mechanism 101 comprises a valve block 105 having an inlet connection 111 adapted to lead to a hydraulic pump such as 13 of Figure 1, and an exhaust connection 112 (Figure 4) adapted to be connected to the liquid reservoir 15 of Figure 1. An exhaust connection 149 (Figure 2) is adapted to be placed in communication with the hydraulic portions of the fluid springs upon actuation of the valves as will later be described; the connection 149 being connected to the reservoir 15 in any suitable manner to provide an association similar to that of the passages 19 and 49 of Figure 1, i.e., the two connections 112 and 149 may be teed into a common return conduit such as 16 of Figure 1. Two operating connections 106 and 106a lead, respectively, to the rear and front fluid springs 2 and 2a as shown in Figure 1.

The inlet connection 111 leads to an annular chamber 130 surrounding a slide valve 125 having a blank radial face at its upper end and a hollow skirt portion 127 forming an axial passage 128 throughout the greater portion of its length; the axial passage 128 leading to the exhaust connection 112. A further passage 126 is formed diametrically across the valve 125 and provides a passage for the flow of liquid pressure from the outer periphery of the valve 125 to the axial passage 128. The valve 125 is slidable in a chamber 121 formed as an axial continuation of the passage 128, and an increased diameter portion 127a of its skirt 127 is normally urged towards abutment with an annular flange 122 in the chamber 121 by a helical compression spring 129 engaged within the skirt 127.

Above the head of the valve 125 a pressure chamber 123 is formed in the housing and liquid pressure from the fluid springs 2 passes through the connection 106 (Figure 2) to a chamber 167 (Figure 4) and thence through a passage 123a to the chamber 123 where it acts upon the top of the valve 125 to press it down in the chamber 121 until the passages 126 therein coincide with the annular chamber 130 and a free flow of pressure liquid is provided between the connections 111 and 112 through the axial passage 128 in the valve 125. Liquid pressure in the chamber 123 also flows through the passage 123b into the valve chamber 171, but the valve 173 being closed, it cannot escape. Liquid pressure in the chamber 130 also flows through the passage 130a to the inlet header 124, which is equivalent to the passage 18 and the pocket 24 of Figure 1, but the valves in the chambers 151 and 132 are closed and the pressure accordingly cannot escape therefrom but flows from the inlet connection 111 through the open passages 130, 126, 128, 112 to the reservoir.

A passage 150 (Figure 3) leads vertically from the end of the chamber 124 nearest to the connection 111 to a valve chamber 151, the upper end of which is connected by a header passage 155 with the upper end of an adjacent valve chamber 156, and a further passage 160 in the side wall of the chamber 156 connects with the side wall of a third valve chamber 161, at the upper end of which is a vertical passage 166 which connects the chamber 161 with an exhaust header 148. A ball valve 153, 158 and 163, respectively, is seated on the upper end of each valve chamber 151, 156 and 161 by a compression spring, and the valves 153 and 163 are engaged, respectively, by a plunger 178, 179 the upper ends of which extend through the top surface of the housing into abutment with the respective portions 188, 187 of an actuating lever 185 which is pivoted at 186 between the plungers so that downward movement of the free end of the lever 185 will depress the plunger 178 and upward movement will depress the plunger 179. The valve 158 is a spring-loaded non-return valve. A passage 165 connects the lower end of the chamber 161 with the connection 106 (Figure 2) to the fluid springs 2.

A similar arrangement of valve chambers 142, 137 and 132 is formed in the left hand of the housing as shown in Figures 1 and 2.

Two vertical valve chambers 170 and 171 (Figure 4) are formed in the housing parallel with the chambers 151, 156 and 161 and substantially midway between them and the three similar valve chambers 132, 137 and 142 (Figure 2). In the upper end of each chamber 170 and 171 is a ball valve 169 and 173, respectively, each of which is spring-urged towards closed position, but the valve 169 normally being held off its seat by a plunger 181 as will be described. The passage 123a connects the chamber 123 with the passage 167 above the valve seat so that if the valve is closed the flow of liquid pressure between the passages 167 and 123a is obstructed. The passage 123b connects the chambers 123 with the valve chamber 171 below the valve 173. Two plungers 181 and 180, respectively, extend through the housing into the exhaust header 148 and are engaged by the opposite ends of a rocking lever 193 which is pivoted to the housing at 194 midway between the plungers 180 and 181. A spring 195 located in a recess in the housing engages the end of the rocking lever 193 abutting the plunger 181 and normally presses the rocking lever against the plunger 181 to hold the valve 169 off its seat. The stem of the plunger 180 is fluted for a portion of its length so that when the valve 173 is opened liquid pressure can flow from the chamber 171 past the flutings into the exhaust header 148. The rocking lever 193 is operable by a projection 191, 191a on each of the operating levers 185, 185a (Figure 2), the projections extending towards each other on adjacent sides of the levers 185, 185a and each engaging slightly less than half of the upper end of a plunger 192, the lower end of which engages the adjacent end of the rocking lever 193.

Operation of the device is substantially the same as is described hereabove in relation to Figure 1.

The levers 185 and 185a are operatively connected with the unsprung portion of the vehicle adjacent the appropriate fluid spring and the necessary hydraulic connections are made. With the vehicle at its static height the lever 185, through the rocking lever 193 and spring 195, holds the plunger 181 depressed and the valve 169 open, and pressure from the fluid springs 2 passes through the connection 106, chamber 167 and passage 123a into the chamber 123, pressing the valve 125 down to allow liquid pressure to flow from the pump 13 through the inlet connection 111, annular chamber 130, passage 126 and axial passage 128 to the exhaust connection 112 and reservoir 15.

If the load on the fluid springs 2 is reduced, the arm 185 pivots anti-clockwise to open the valve 163 and allow liquid pressure to flow from the connection 106 through the passage 165, chamber 161 and passage 166 to the exhaust header 148 and second exhaust connection 149, to the reservoir 15 and the vehicle body moves downwards towards the axle as the pressure in the springs is reduced; the lever 185 pivoting to close the valve 163 when the static height is regained.

If the vehicle body is too close to the axle due to an increased load, pivoting of the arm 185 in a clockwise direction will open the valve 173 and allow the valve 169 to close, so that liquid pressure in the chamber 123 will escape through the passage 123b and chamber 171, past the flutings on the plunger 180 into the exhaust header 148. Reduction of the liquid pressure in the chamber 123 will allow the spring 129 to press the valve 125 upwards to close the passages 126 and the liquid pressure produced by the pump 13 will then flow through the annular chamber 130 and passage 130a to the inlet header 124 and thence through the passage 150, chamber 151, past the valve 153, which has been opened by the plunger 178 on movement of the lever 185, and thence through passage 155, to unseat the non-return valve 158, passage 160, chamber 161, and passage 165, to the connection 106 and the fluid spring 2. As the vehicle body rises the arm 185 will return to normal position, the valves 153 and 173 will close, the valve 169 will open, and liquid pressure in the chamber 123 will again move the valve 125 to open the passages 126, 128 to the free flow of pressure liquid from the pump back to the reservoir.

It will be seen from the above that this practical embodiment of the invention operates precisely as has been described in relation to the diagrammatic form shown in Figure 1 and further description is accordingly deemed to be superfluous. As shown in Figure 1, the liquid pressure required to hold the valve 125 downwards against the spring 129 is provided by only one side of the valve assembly, i.e., through the connection 106. There is no fluid passage from the connection 106a to the pressure chamber 123.

Having now described my invention, what I claim is:

1. A levelling valve mechanism for fluid pressure suspension systems which comprises a housing having an inlet for pressure fluids, a delivery outlet, an exhaust outlet, a pressure chamber and a passage through said housing comprising an inlet part from said inlet and an outlet part from said inlet part to said exhaust outlet and a first branch passageway from said inlet part to said pressure chamber, a second branch passageway from said inlet part to said delivery outlet and a third branch passageway from said pressure chamber to said outlet part of said passage; a pressure control valve between said inlet part and said outlet part of said passage subject to the pressure in said pressure chamber to close said passage between said inlet part and said outlet part upon a drop in pressure in said pressure chamber and to open said valve upon a rise in pressure in said pressure chamber thereby to control the pressure in said inlet part of said passage; a normally open first spring pressed valve movable to close the first branch passageway to said pressure chamber; a second spring pressed valve normally closing said second branch passageway from said inlet part of said passage to said delivery outlet; a third, normally closed, spring pressed valve closing said third passageway from said pressure chamber to said exhaust outlet; and means movable in one direction to open said second and third spring pressed valves and to close said first spring pressed valve.

2. The levelling valve of claim 1 in which said first and second passageways have a common passage to said second spring pressed valve and which has a check valve in series with said second spring pressed valve.

3. A valve according to claim 1 wherein said means comprises a first plunger device normally holding said first spring pressed valve in its open position, a second plunger device movable from its normal position to open said second spring pressed valve, a normally closed valve in said passageway to said delivery outlet, and a plunger actuated by said means and movable from its normal position to open said normally closed valve to permit the flow of fluid in said passage to said exhaust outlet.

4. The levelling valve mechanism of claim 1 having a check valve in said second branch passageway between said second spring pressed valve and said delivery outlet and in which said housing has a by-pass passage from said second branch passageway between said second spring pressed valve and said delivery outlet to said exhaust outlet, a by-pass valve spring pressed to close said by-pass passage and in which said means comprises a plunger to open said by-pass valve when said means is moved in reverse.

5. The valve of claim 4 in which said means is movable from a mid position alternatively to open the valve from said inlet to said delivery passageway and from said delivery passageway to said exhaust passageway.

6. The valve of claim 1 in which said passage through said chamber comprises a cylindrical portion of the passageway from said pressure chamber to said exhaust outlet, said cylindrical portion being enlarged between its ends, a hollow cylindrical valve extending in said cylindrical portion and having a closed end facing said pressure chamber, the opposite end being open, said cylindrical valve having openings in its wall for communication between said inlet part of said passage and said outlet part of said passage, and being spring pressed to move toward said pressure chamber to bring said openings out of alignment with said passageway and close said communication, and being movable by pressure in said pressure chamber in the opposite direction to bring said openings into alignment with said passageway to form communication between said inlet and said exhaust outlet.

7. The levelling valve mechanism of claim 1 in which said pressure control valve comprises a cylindrical valve chamber between said inlet part and said outlet part of said passage and opening into said pressure chamber and into said outlet part, said inlet part of said passage intersecting said valve chamber, and a hollow valve in said cylindrical valve chamber closed to said pressure chamber and having inlet openings communicating with said inlet part when moved to open position by pressure in said pressure chamber and a spring pressing said valve to closed position with said inlet openings out of communication with said inlet part of said passage.

8. A levelling valve system for a fluid suspension for vehicles which comprises a valve housing having a pressure fluid inlet, an exhaust outlet, and a passage from said inlet to said exhaust outlet, a pressure control valve in said housing movable alternatively to close and to open said passage between said inlet and said exhaust outlet, said housing having a delivery outlet and a passageway leading from said passage between said inlet and said pressure control valve to said delivery outlet, a non-return valve in said passageway to open and close said passageway, an exhaust valve from said passageway between said non-return valve and said exhaust outlet, operating means to open and close said pressure control valve and alternatively to open and close said non-return valve and close and open said exhaust valve, a movable element of said vehicle suspension, and actuating means mounted between said valve housing and said movable element to actuate said operating means in one direction or the other upon relative movement between said housing and said movable element.

References Cited in the file of this patent
UNITED STATES PATENTS

| | | |
|---|---|---|
| 2,057,088 | Millar | Oct. 13, 1936 |
| 2,319,551 | Linden | May 18, 1943 |
| 2,809,051 | Jackson | Oct. 8, 1957 |